United States Patent
Ikegaya et al.

[11] Patent Number: 5,890,082
[45] Date of Patent: Mar. 30, 1999

[54] ADAPTIVE FRONT AND REAR WHEEL STEERING SYSTEM

[75] Inventors: Manabu Ikegaya; Yoshimitsu Akuta; Kiyoshi Wakamatsu, all of Saitama-ken, Japan

[73] Assignee: Honda Giken Kogyo Kabushiki Kaisha, Tokyo, Japan

[21] Appl. No.: 720,083

[22] Filed: Sep. 27, 1996

[30] Foreign Application Priority Data

Oct. 4, 1995 [JP] Japan ................................. 7-284670

[51] Int. Cl.⁶ ......................................................... B62D 6/00
[52] U.S. Cl. ........................... 701/41; 180/413; 701/42
[58] Field of Search ................................ 701/41, 42, 80; 180/413, 443, 445; 303/150

[56] References Cited

U.S. PATENT DOCUMENTS

| | | | |
|---|---|---|---|
| 4,666,013 | 5/1987 | Shibabata et al. | 180/141 |
| 4,703,822 | 11/1987 | Kawamoto et al. | 180/140 |
| 4,834,205 | 5/1989 | Mizuno et al. | 180/141 |
| 4,901,811 | 2/1990 | Uno et al. | 180/140 |
| 5,019,982 | 5/1991 | Furukawa | 364/589 |
| 5,267,160 | 11/1993 | Ito et al. | 364/424.05 |
| 5,388,658 | 2/1995 | Ando et al. | 180/197 |
| 5,551,771 | 9/1996 | Akuzawa et al. | 303/186 |
| 5,557,552 | 9/1996 | Naito et al. | 364/565 |

*Primary Examiner*—Michal Zanelli
*Attorney, Agent, or Firm*—Carrier, Blackman & Associates, P.C.; Joseph P. Carrier; William D. Blackman

[57] ABSTRACT

In a front and rear wheel steering system for steering rear wheels of a vehicle at a certain ratio to front wheels of the vehicle, the rear wheel steering angle is determined according to the steering input and/or the operating conditions of the vehicle, additionally, taking into account the kind of the particular tires that are being used. In particular, it is advantageous to distinguish between normal tires and studless tires as they demonstrate significantly different properties. The kind of tires can be identified either by computing the frictional coefficient of the road surface or by a manual switch. Thus, the handling of the vehicle can be kept unchanged without regard to the kind of the tires that are being used.

10 Claims, 9 Drawing Sheets

ADAPTIVE FRONT AND REAR WHEEL STEERING SYSTEM

TECHNICAL FIELD

The present invention relates to a front and rear wheel steering system which steers the rear wheels of the vehicle at a prescribed steering angle ratio to the front wheels according to the traveling speed of the vehicle, and in particular to such a front and rear wheel steering system which can adapt itself to the particular tires used on the wheels.

BACKGROUND OF THE INVENTION

Various specialized tires such as high performance tires, snow tires and studless tires are now available on the market, and are selected according to the particular need and desire of the user. In particular, studless tires are receiving a wide acceptance because they allow the vehicle to travel over snowy or icy road surfaces without losing traction, and over normal road surfaces without damaging the ride comfort of the vehicle.

However, those specialized tires are known to significantly change the handling of the vehicle, in particular in high speed ranges. Therefore, the vehicle operator is required to adapt himself to the different handling of the vehicle owing to the changing of the tires, and this may cause a significant stress on him. FIGS. 9(a) to 9(d) show graphs for demonstrating the handling of a conventional front wheel steering vehicle. According to these graphs, it can be seen that studless tires give rise to significantly reduced gains and large phase delays of the lateral response of the vehicle, such as yaw rate and lateral acceleration, near 1 Hz as compared to normal tires. In this application "normal tires" refers to radial tires commonly used on vehicles.

A number of proposals have been made to improve the steering stability of a vehicle by using a front and rear wheel steering system. Two different ways of controlling the steering angle of the rear wheels are known. The rear wheels may be steered according to the principle of feed-forward control or according to a predetermined pattern which is given as a mathematical function of the steering wheel angle, the angular speed of the steering wheel, the vehicle speed and other data. The rear wheels may also be steered according to the principle of feedback control or according to the response data of the vehicle such as lateral acceleration and yaw rate. However, these control principles are designed for predetermined control parameters, and produce optimum results only under standard conditions. When the tires are changed to specialized tires such as studless tires, the vehicle demonstrates a different lateral response; the gain diminishes, and the phase delay increases in terms of yaw rate or lateral acceleration for a given steering input. Such deviations from standard conditions could prevent the rear from being steered in a satisfactory fashion.

BRIEF SUMMARY OF THE INVENTION

In view of such problems of the prior art, a primary object of the present invention is to provide a front and rear wheel steering system which can operate in an optimum fashion even when some of the vehicle parameters are changed from a standard condition.

A second object of the present invention is to provide a front and rear wheel steering system which can operate in an optimum fashion even when the tires of the vehicle are changed.

According to the present invention, such objects can be accomplished by providing a front and rear wheel steering system for steering rear wheels of a vehicle at a certain ratio to front wheels of the vehicle, comprising: tire identifying means for identifying a kind of tires that are being used; rear wheel steering angle computing means which determines a target rear wheel steering angle according to an operating condition of the vehicle; and an actuator for steering rear wheels according to the computed target rear wheel steering angle; the rear wheel steering angle computing means being provided with at least two different operating modes for computing the target rear wheel steering angle, and the computing means selecting one of the operating modes according to the kind of tires identified by the tire identifying means.

Thus, the handling of the vehicle can be kept unchanged without regard to the kind of the tires that are being used. In particular, it is advantageous to distinguish between normal tires and studless tires as they demonstrate significantly different properties. The kind of tires can be identified either by computing the frictional coefficient of the road surface or by a manual switch.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
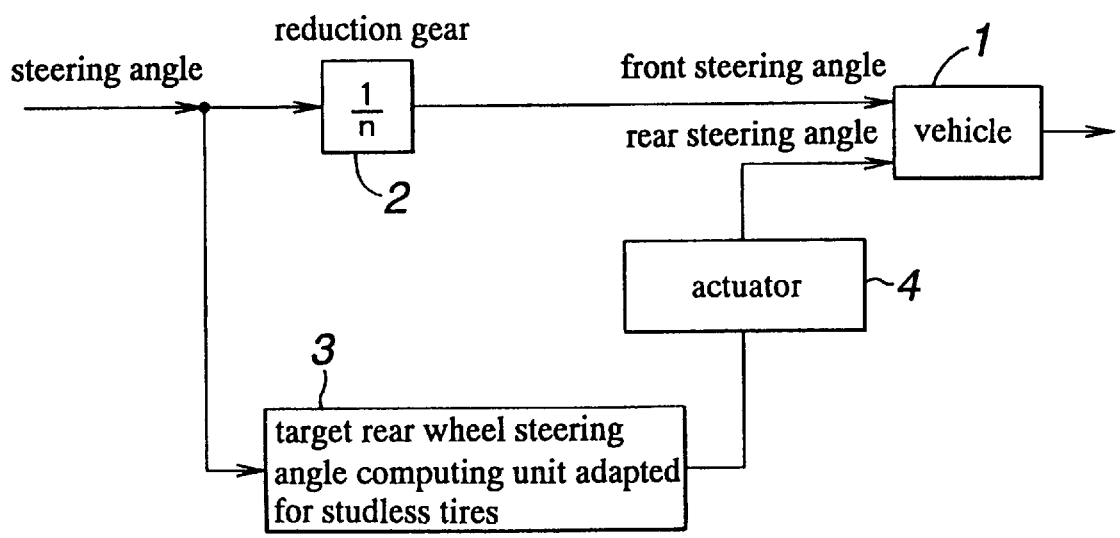
FIG. 1 is a block diagram of a first embodiment of the present invention constructed as a feed forward four wheel steering system.

FIG. 1 is a block diagram of a four wheel steering system based on feed forward control which is given as a first embodiment of the present invention. The steering input applied to the steering wheel of a vehicle 1 is transmitted to the front wheels via a reduction gear 2 at the gear ratio of 1/n. A feed forward target rear wheel steering angle is computed by a target rear wheel steering angle computing unit 3 according to the steering wheel angle, the angular speed of the steering wheel, the vehicle speed and the kind of tires, such as normal tires and studless tires, which are being used. The computed rear wheel steering angle is achieved by an actuator 4 carried by the vehicle 1.

Figure 2:
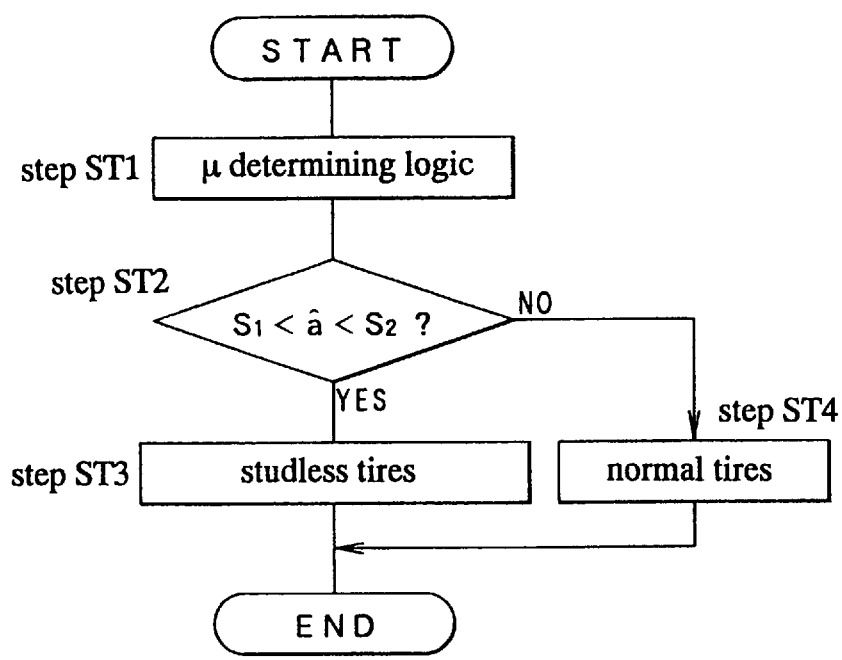
FIG. 2 is a flow chart showing the control flow for identifying the kind of tires.

The process flow of the target rear wheel steering angle computing unit 3 is described with reference to the flow charts of FIGS. 2 and 3. FIG. 2 illustrates a tire identifying routine. First of all, a parameter â corresponding to the frictional coefficient ($\mu$) is identified according to various data in step ST1. Copending U.S. patent application Ser. No. 08/697,233 filed Aug. 21, 1997. discloses a number of possible methods for estimating the frictional coefficient of the road surface, and the contents of this copending application is hereby incorporated in the present application by reference. It is determined in step ST2 if the parameter â is within a prescribed range (from S1 to S2) or not. If the parameter â is within this range, it is determined that studless tires are being used (step ST3). If the parameter â is outside this range, it is determined that normal tires are being used (step ST4). This routine is not required to be repeated at least until the vehicle comes to a full stop. The identified parameter â is known to be lower when studless tires are used than when normal tires are used. In other words, it is possible to identify the kind of tires that are being used from the value of the parameter â.

Figure 3:
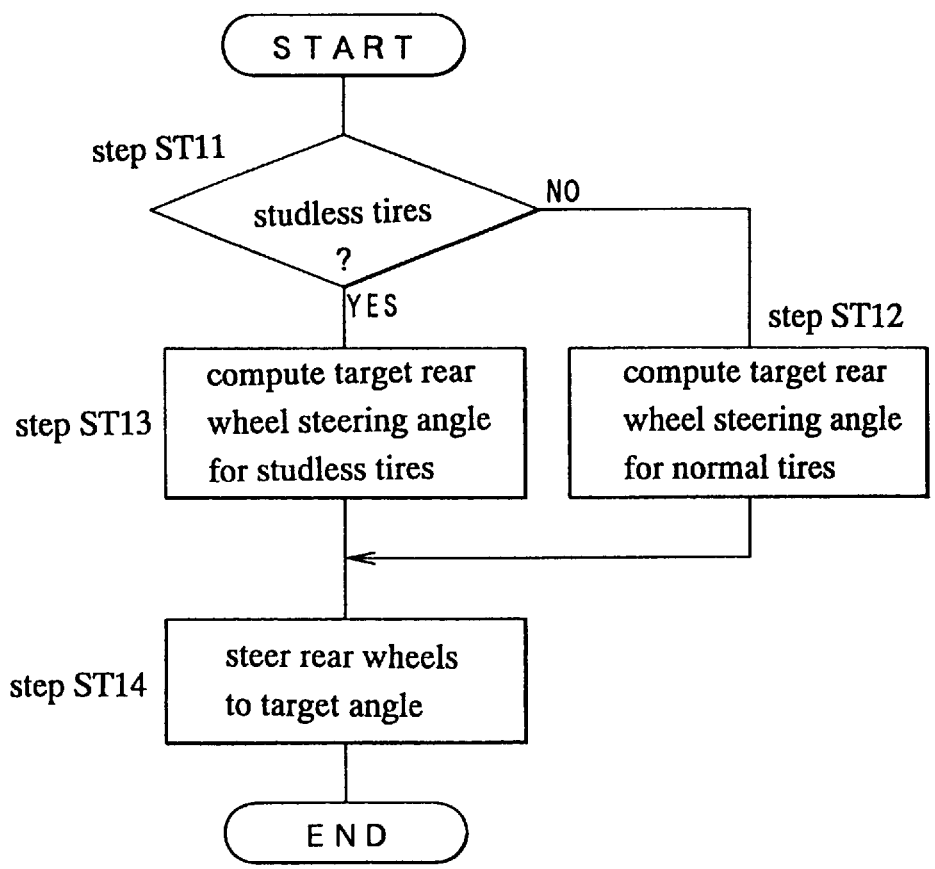
FIG. 3 is a flow chart showing the control flow for computing a target rear wheel steering angle.
Figure 4:
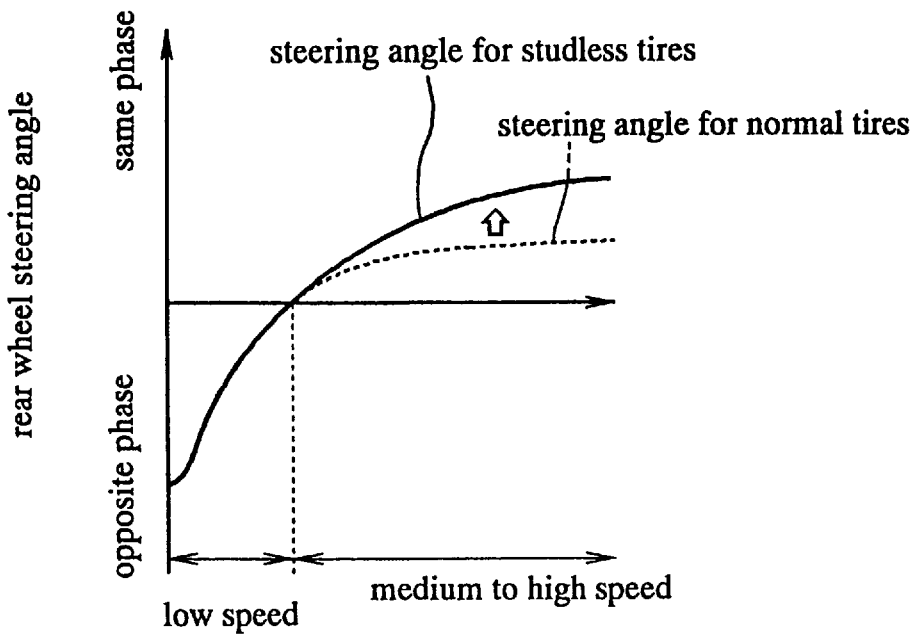
FIG. 4 is a graph showing the difference in the relationship between the vehicle speed and the target rear wheel steering angle when normal tires are used and when studless tires are used.
Figure 5:
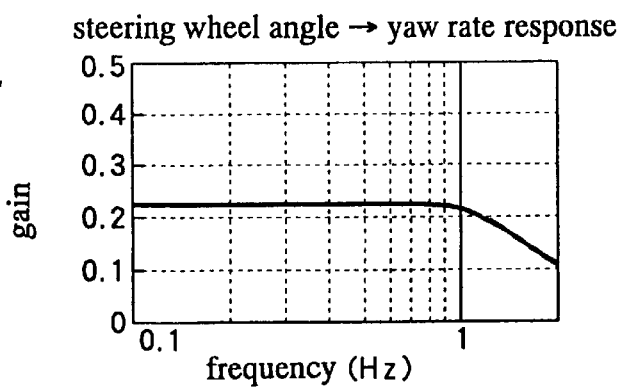
FIGS. 5(a) to 5(d) are graphs showing the frequency response of a four-wheel steering vehicle according to the present invention.
Figure 5:
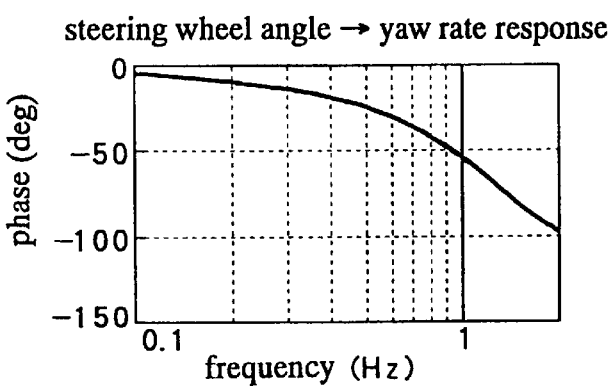
Figure 5:
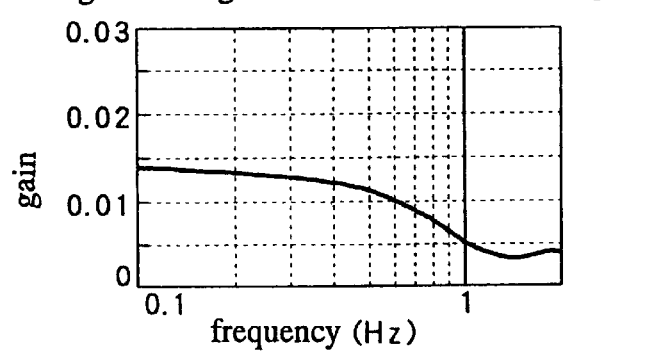
Figure 5:
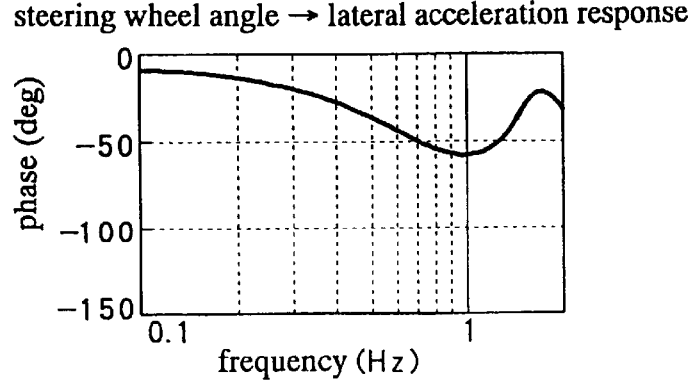

Then, the control flow advances to the main control routine illustrated in FIG. 3. According to the principle of feed forward control, the target rear wheel steering angle is given as a mathematical function of the steering wheel angle, the angular speed of the steering wheel and the vehicle speed, and, typically, this is carried out by using a look up table or a map. In this embodiment, two such maps are prepared so that either one of them may be selected depending on whether normal tires are used or studless tires are used. In step ST11, it is determined if studless tires are used. If normal tires are used, the program flow advances to step ST12, and the target rear wheel steering angle is obtained by using a map for normal tires. If studless tires are used, the program flow advances to step ST13, and the target rear wheel steering angle is obtained by using a map for studless tires. In either case, the target rear wheel steering angle is actually produced by using the actuator 4 in step ST14. The graph of FIG. 4 illustrates a typical difference between the maps for studless tires and normal tires. Typically, the map for studless tires causes the rear wheels to be steered more in the same phase relationship to the front wheels than that for normal tires, in medium to high speed ranges. FIGS. 5(a) to 5(d) show the gain and phase relationship of the yaw rate and lateral acceleration responses of a vehicle which is equipped with the above described front and rear wheel steering system.

Figure 6:
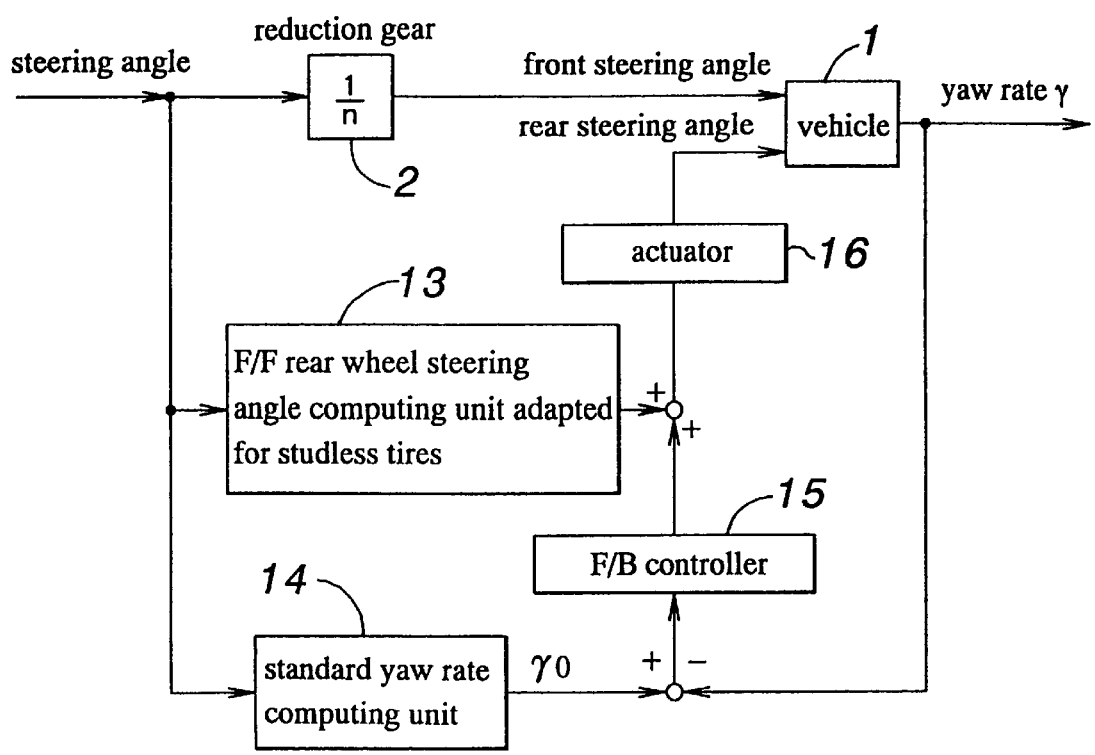
FIG. 6 is a view similar to FIG. 1 showing a second embodiment of the present invention.

FIG. 6 is a block diagram of a four wheel steering system based on a combination of a feed-forward control and a feed-back control which is given as a second embodiment of the present invention. The steering input applied to the steering wheel of a vehicle 1 is transmitted to the front wheels via a reduction gear 2 at the gear ratio of 1/n. A feed forward target rear wheel steering angle is computed by a target rear wheel steering angle computing unit 13 according to the steering wheel angle, the angular speed of the steering wheel and the vehicle speed. A standard yaw rate $\gamma_0$ is computed by a standard yaw rate computing unit 14 according to the current steering wheel angle. An actual yaw rate $\gamma$ is detected by a yaw rate sensor mounted to a suitable location on the vehicle body. The difference between the standard yaw rate and the actual yaw rate is supplied to a feedback controller 15 to compute a feedback target rear wheel steering angle. The feed forward target rear wheel steering angle and the feedback target rear wheel steering angle are then suitable added or averaged, and supplied to an actuator 16 which actually steers the rear wheels. The target rear wheel steering angle computing unit 13 is similar to the target rear wheel steering angle computing unit 3 of the first embodiment. For more details of the remaining part of the system and other aspects of the present invention, reference should be made to the following copending patent applications; Ser. No. 08/328,844 filed Oct. 25, 1994, now U.S. Pat. No. 5,615,117, Ser. No. 08/396,543 filed Mar. 2, 1995, now U.S. Pat. No. 5,576,957 and Ser. No. 08/398,183 filed Mar. 3, 1995. The contents of these copending applications are hereby incorporated in the present application by reference.

Figure 7:
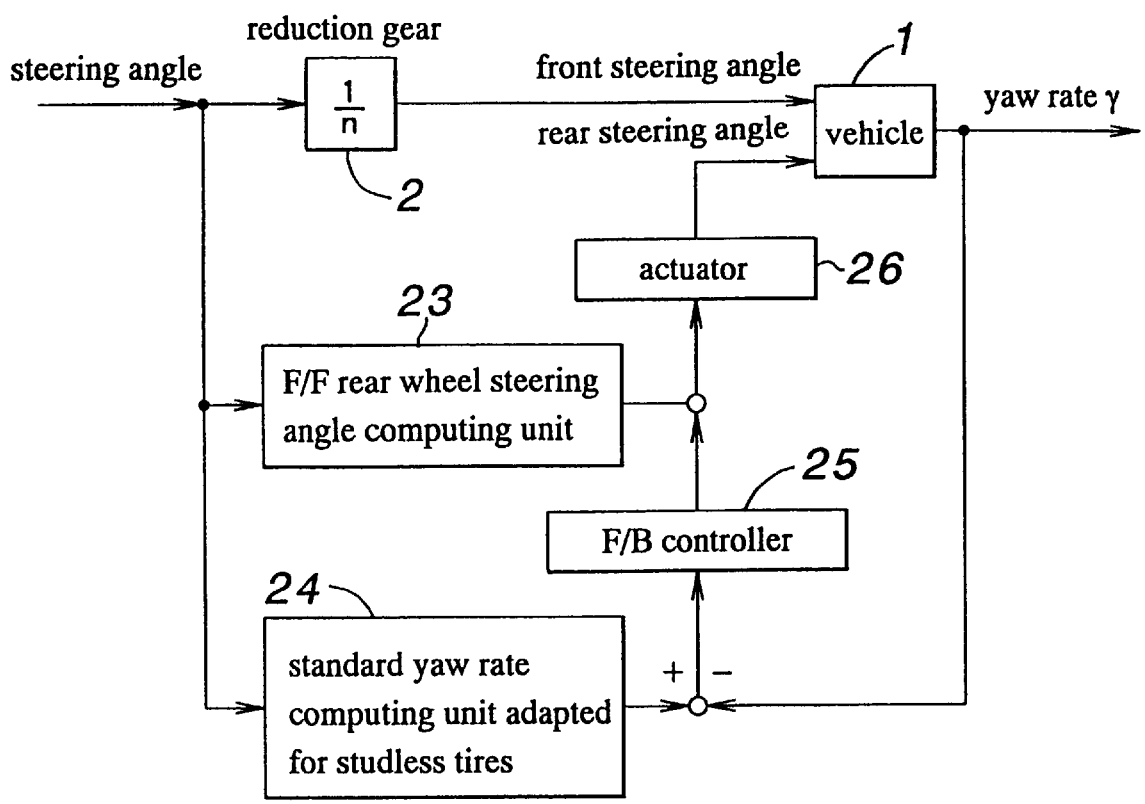
FIG. 7 is a view similar to FIG. 1 showing a third embodiment of the present invention.

FIG. 7 is a block diagram of a four wheel steering system based on a combination of a feed-forward control and a feed-back control which is given as a third embodiment of the present invention. The steering input applied to the steering wheel of a vehicle 1 is transmitted to the front wheels via a reduction gear 2 at the gear ratio of 1/n. A feed forward target rear wheel steering angle is computed by a target rear wheel steering angle computing unit 23 according to the steering wheel angle, the angular speed of the steering wheel, and the vehicle speed. A standard yaw rate $\gamma_0$ is computed by a standard yaw rate computing unit 24 according to the current steering wheel angle. An actual yaw rate $\gamma$ is detected by a yaw rate sensor mounted to a suitable location on the vehicle body. The difference between the standard yaw rate and the actual yaw rate is supplied to a feedback controller 25 to compute a feedback target rear wheel steering angle. The feed forward target rear wheel steering angle and the feedback target rear wheel steering angle are then suitable added or averaged, and supplied to an actuator 26 which actually steers the rear wheels.

Figure 8:
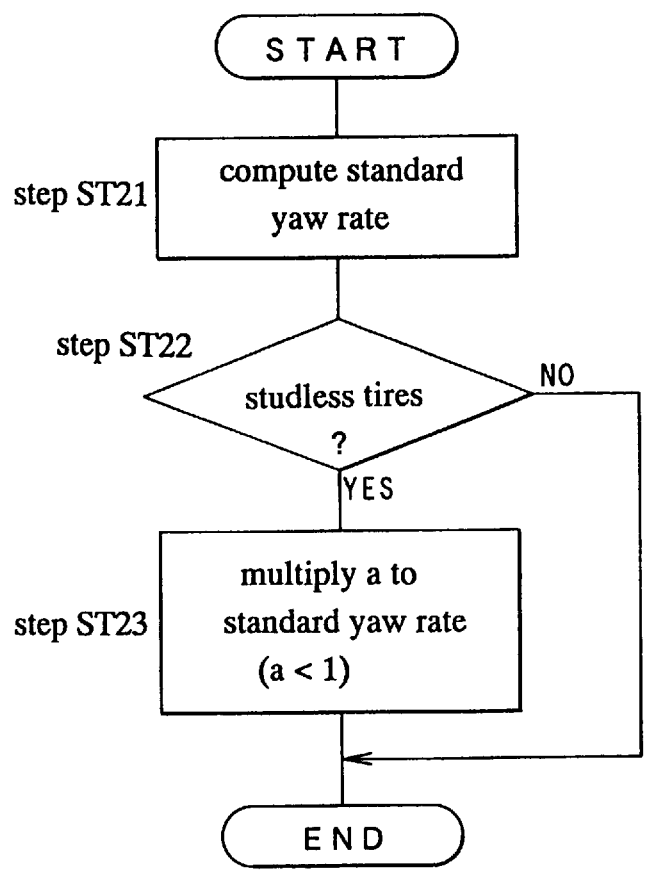
FIG. 8 is a flow chart showing the control flow for computing a standard yaw rate.
Figure 9:
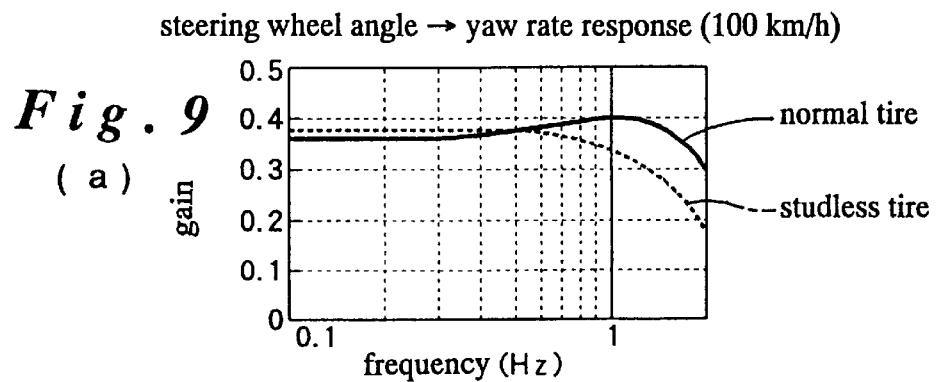
FIGS. 9(a) to 9(d) are graphs showing the frequency response of a conventional two-wheel steering vehicle.
Figure 9:
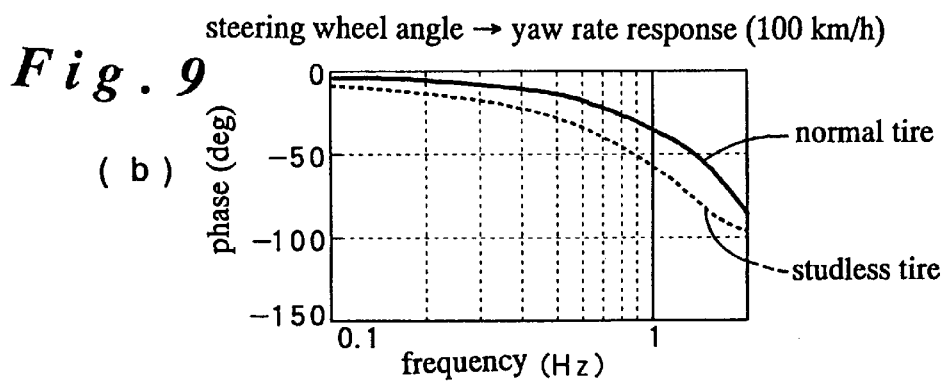
Figure 9:
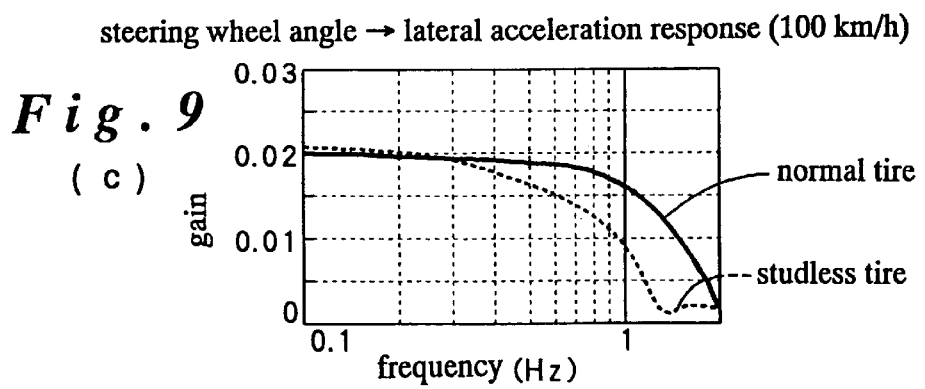
Figure 9:
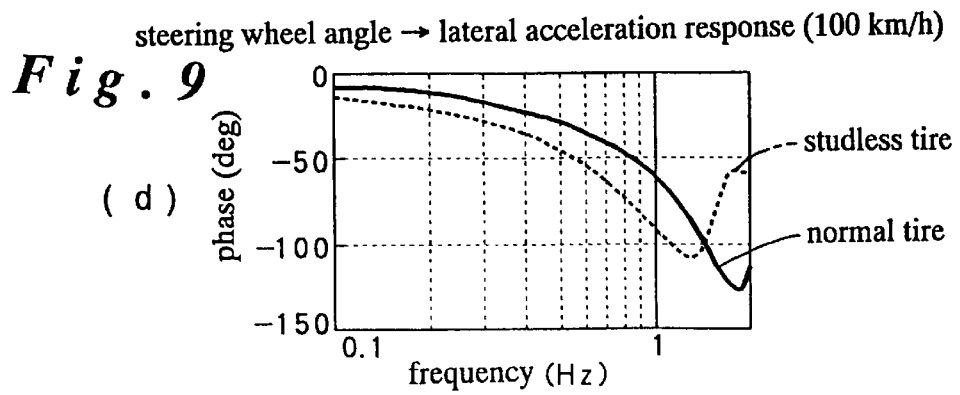

According to this embodiment, as illustrated in FIG. 8, a gain constant a (a<1) which is multiplied to the standard yaw rate in the standard yaw rate computing unit 24 is reduced from a normal value when studless tires are used. As a result, the feedback target rear wheel steering angle is increased in the same phase relationship, and the resulting increase in the rear wheel steering angle improves the lateral stability of the vehicle. For more details of this embodiment, reference should be made to the description of the preceding embodiments, and the copending patent applications mentioned in the present application.

In the above described embodiments, it was automatically detected from the frictional coefficient ($\mu$) of the road surface if studless tires are being used or not. But, according to the broad concept of the present invention, it is also possible to use a manual switch to indicate to the system what sort of tires are being used.

According to the present invention, by suitably modifying the parameters of the front and rear wheel steering system depending on the kind of tires which are being used, it is possible to optimize the performance of the system. In particular, it is possible to achieve a constant gain and a controlled phase delay of the lateral response of the vehicle such as yaw rate and lateral acceleration, up to the frequency of 1 Hz, and this can make a significant improvement in the handling of the vehicle.

Although the present invention has been described in terms of specific embodiments thereof, it is possible to modify and alter details thereof without departing from the spirit of the present invention.

What we claim is:

1. A front and rear wheel steering system for steering rear wheels of a vehicle at a certain ratio to front wheels of the vehicle, comprising:

tire identifying means for identifying a type of tires that is being used;

rear wheel steering angle computing means which determines a target rear wheel steering angle according to an operating condition of said vehicle; and an actuator for steering the rear wheels according to the computed target rear wheel steering angle;

said rear wheel steering angle computing means being provided with at least two different operating modes for computing the rear wheel steering angle, and the computing means selecting one of said operating modes according to the kind of tires identified by said tire identifying means; and said tire identifying means comprising means for determining a frictional coefficient of a road surface. and identifies the kind of tires that are being used from a determined frictional coefficient of a road surface.

2. A front and rear wheel steering system for steering rear wheels of a vehicle at a certain ratio to front wheels of the vehicle, comprising:

tire identifying means for identifying a type of tires that is being used;

rear wheel steering angle computing means which determines a target rear wheel steering angle according to an operating condition of said vehicle; and an actuator for steering the rear wheels according to the computed target rear wheel steering angle;

said rear wheel steering angle computing means being provided with at least two different operating modes for computing the rear wheel steering angle, and the computing means selecting one of said operating modes according to the kind of tires identified by said tire identifying means; and said tire identifying means comprising a manual switch which can be operated by a vehicle operator.

3. A front and rear wheel steering system according to claim 1, wherein said tire identifying means distinguishes between normal tires and studless tires.

4. A front and rear wheel steering system according to claim 1, wherein said rear wheel steering angle computing means comprises a feed-forward target rear wheel steering angle computing means having two different operating modes that can be selected according to an output from said tire identifying means.

5. A front and rear wheel steering system according to claim 1, wherein said rear wheel steering angle computing means comprises a feedback target rear wheel steering angle computing means having two different operating modes that can be selected according to an output from said tire identifying means.

6. A front and rear wheel steering system for steering rear wheels of a vehicle at a certain ratio to front wheels of the vehicle, comprising:

means for identifying a type of tires being used on the vehicle;

means for determining an operating condition of said vehicle;

means for computing a target rear wheel steering angle according to a determined operating condition of said vehicle and an identified type of tires being used on the vehicle; and an actuator for steering the rear wheels according to the computed target rear wheel steering angle, said tire type identifying means comprising means for determining a frictional coefficient of a road surface. and identifying the type of tires that is being used from a determined frictional coefficient of a road surface.

7. A front and rear wheel steering system according to claim 6, wherein said computing means has at least two different operating modes for computing the rear wheel steering angle corresponding to different types of tires that may be identified by said tire identifying means, and said computing means computing said target rear wheel steering angle according to one of said operating modes corresponding to the type of tires identified by said tire identifying means.

8. A front and rear wheel steering system according to claim 6, wherein said tire identifying means further comprises a manual switch which can be operated by a vehicle operator.

9. A front and rear wheel steering system according to claim 6, wherein said rear wheel steering angle computing means comprises a feed-forward target rear wheel steering angle computing means having at least two different operating modes which are individually selected according to an output from said tire identifying means.

10. A front and rear wheel steering system according to claim 6, wherein said rear wheel steering angle computing means comprises a feedback target rear wheel steering angle computing means having at least two different operating modes which are individually selected according to an output from said tire identifying means.

* * * * *

UNITED STATES PATENT AND TRADEMARK OFFICE
CERTIFICATE OF CORRECTION

PATENT NO : 5,890,082
DATED : 30 March 1999
INVENTOR(S): Manabu Ikegaya; Yoshimitsu Akuta; Kiyoshi Wakamatsu It is certified that error appears in the above-identified patent and that said Letters Patent is hereby corrected as shown below:

On the cover page, under "[56]References Cited", correct the spelling of "Shibabata et al." to --Shibahata et al--;
  after "*Primary Examiner*" change "Michal" to --Michael--.

Column 3, 8th line, change "is" to --are--;
  line 44, change "above described" to --above- described--;
  line 64, change "suitable " to --suitably--.

Column 4, 5th line, change "Mar. 2, 1995" to --Mar. 1, 1995--;
  6th line, change "08/398,183" to --08/398,138--;
  27th line, change "suitable" to --suitably--.

Column 6, 15th line (claim 6, line 15), change the period to a comma.

Signed and Sealed this

Twenty-seventh Day of July, 1999

*Attest:*

Q. TODD DICKINSON

*Attesting Officer*   *Acting Commissioner of Patents and Trademarks*